United States Patent [19]
Roel-Ng et al.

[11] Patent Number: 6,002,936
[45] Date of Patent: Dec. 14, 1999

[54] SYSTEM AND METHOD FOR INFORMING NETWORK OF TERMINAL-BASED POSITIONING METHOD CAPABILITIES

[75] Inventors: Maya Roel-Ng, Plano; Stephen Hayes, Carrollton; Theodore Havinis, Plano, all of Tex.

[73] Assignee: Ericsson Inc., Research Triangle Park, N.C.

[21] Appl. No.: 09/037,071

[22] Filed: Mar. 9, 1998

[51] Int. Cl.[6] .................................................. H04Q 7/20
[52] U.S. Cl. ........................................................ 455/456
[58] Field of Search .................................. 455/456, 404, 455/435, 412, 413, 414, 433, 436, 553

[56] References Cited

U.S. PATENT DOCUMENTS

| | | | |
|---|---|---|---|
| 5,504,939 | 4/1996 | Mayrand et al. | 455/450 |
| 5,519,760 | 5/1996 | Borkowski et al. | 455/404 |
| 5,568,153 | 10/1996 | Beliveau | 455/433 |
| 5,600,706 | 2/1997 | Dunn et al. | 455/456 |
| 5,724,660 | 3/1998 | Kauser et al. | 455/456 |

FOREIGN PATENT DOCUMENTS 0 800 319 A1  10/1997  European Pat. Off. .

OTHER PUBLICATIONS

PCT International Search Report dated Jun. 11, 1999.

*Primary Examiner*—William G. Trost
*Assistant Examiner*—Raymond B. Persino
*Attorney, Agent, or Firm*—Jenkens & Gilchrist, P.C.

[57] ABSTRACT

A telecommunications system and method is disclosed for allowing a cellular network to determine the optimum positioning method, having knowledge of all available network-based and terminal-based positioning methods. This can be accomplished by the Mobile Station (MS) sending to the Mobile Switching Center/Visitor Location Register (MSC/VLR) a list of terminal-based positioning methods that the MS is capable of performing. This list can, in turn, be forwarded to the Mobile Positioning Center (MPC) for determination of the optimum positioning method. For example, in a GSM network, the MS CLASSMARK information, which is sent to the MSC/VLR when the MS registers with the MSC/VLR, can be extended to include the MS's positioning capabilities.

18 Claims, 5 Drawing Sheets

SYSTEM AND METHOD FOR INFORMING NETWORK OF TERMINAL-BASED POSITIONING METHOD CAPABILITIES

BACKGROUND OF THE PRESENT INVENTION

1. Field of the Invention

The present invention relates generally to telecommunications systems and methods for determining the location of a mobile terminal within a cellular network, and specifically to determining the optimum positioning method based upon available network positioning methods and positioning capabilities of the mobile terminal itself.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS 20 within a cellular network 10 has recently become important for a wide range of applications. For example, positioning services may be used by transport and taxi companies to determine the location of their vehicles. In addition, for emergency calls, e.g., 911 calls, the exact location of the mobile terminal 20 may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital.

As can be seen in FIG. 2 of the drawings, upon a network positioning request, the Base Station System (BSS) (220 and 240) serving the MS 200 generates positioning data, which is delivered to the Mobile Switching Center (MSC) 260. This positioning data is then forwarded to a Mobile Positioning Center (MPC) 270 for calculation of the geographical location of the MS 200. The location of the MS 200 can then be sent to the application 280 that requested the positioning. Alternatively, the requesting application 280 could be located within the MS 200 itself or within the network (MSC/VLR 260).

In order to accurately determine the location of the MS 200, positioning data from three or more separate Base Transceiver Stations (210, 220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends upon the distance between the MS 200 and the BTS 220. TA values are expressed in bit periods, and can range from 0 to 63, with each bit period corresponding to approximately 550 meters between the MS 200 and the BTS 220. It should be understood, however, that any estimate of time, distance, or angle for any cellular system can be used, instead of the TA value discussed herein for a network-based positioning method.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the mobile station 200 can be determined (with certain accuracy) by the Mobile Positioning Center 270.

Therefore, Timing Advance (TA) values are obtained from the original (serving) BTS 220 and two neighboring (target) BTSs (210 and 230). In order for each target BTS (210 and 230) to determine a TA value, a positioning handover to each of the BTSs (210 and 230) must occur. A positioning handover is similar to an ordinary asynchronous handover. The target BTS, e.g., BTS 210, distinguishes the Positioning Handover from an ordinary handover by a new ACTIVATION TYPE in the CHANNEL ACTIVATION message. Unlike an ordinary handover, upon reception of a HANDOVER ACCESS message from the MS 200, the target BTS 210 only calculates the TA value, and does not respond to the mobile station 200, that is, no PHYSICAL INFORMATION is sent to the MS 200. Thus, the MS 200 will then return to the previous channel allocated by the original BTS 220 after the time period defined by the MS's 200 internal counter expires, e.g., 320 milliseconds.

Alternatively, the MS 200 itself can position itself within the cellular network 205. For example, the MS 200 can have a Global Positioning System (GPS) receiver built into it, which is used to determine the location of the MS 200. In addition, the MS 200 can collect positioning data based on the Observed Time Difference (OTD) between the time a BTS 220 sends out a signal and the time the MS 200 receives the signal. This time difference information can be sent to the MPC 270 for calculation of the location of the MS 200, or the MS 200 itself, with knowledge of the location of the BTS 220, can determine it's location.

As the market demands higher accuracy, e.g., FCC phase II E-911 service, Mobile Stations 200 which can perform positioning measurements are expected to flood the market. However, in order for a network 205 to be flexible enough to select the best positioning method on a case by case situation, it is necessary that the network 205 have knowledge of the positioning capabilities of all involved nodes, network-based and MS-based. Therefore, based on all available positioning methods, the network (MPC 270) can have the ability to select either a network-based positioning method or a MS-based positioning method after all input factors have been considered. Such input factors include the requested quality of service, time of day of request, requesting application, subscription status of the subscriber, as well as positioning method capabilities of the serving network 205 and of the subscriber terminal 200.

It is, therefore, an object of the present invention to enable a cellular network to determine the optimum positioning method based upon all available network-based and terminal-based positioning methods.

It is a further object of the present invention to inform the cellular network, serving the location area that the mobile terminal to be positioned is located in, about all available terminal-based positioning methods.

SUMMARY OF THE INVENTION

The present invention is directed to telecommunications systems and methods for allowing a cellular network to determine the optimum positioning method, having knowledge of all available network-based and terminal-based positioning methods. This can be accomplished by the Mobile Station (MS) sending to the Mobile Switching Center/Visitor Location Register (MSC/VLR) a list of terminal-based positioning methods that the MS is capable of performing. This list can, in turn, be forwarded to the Mobile Positioning Center (MPC) for determination of the optimum positioning method. For example, in a GSM network, the MS CLASSMARK information, which is sent to the MSC/VLR when the MS registers with the MSC/VLR, can be extended to include the MS's positioning capabilities. Advantageously, by sending the MS positioning capabilities to the MSC/VLR, the network can choose the optimum available positioning method for the particular positioning request, taking into consideration the requested quality of service.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 3:
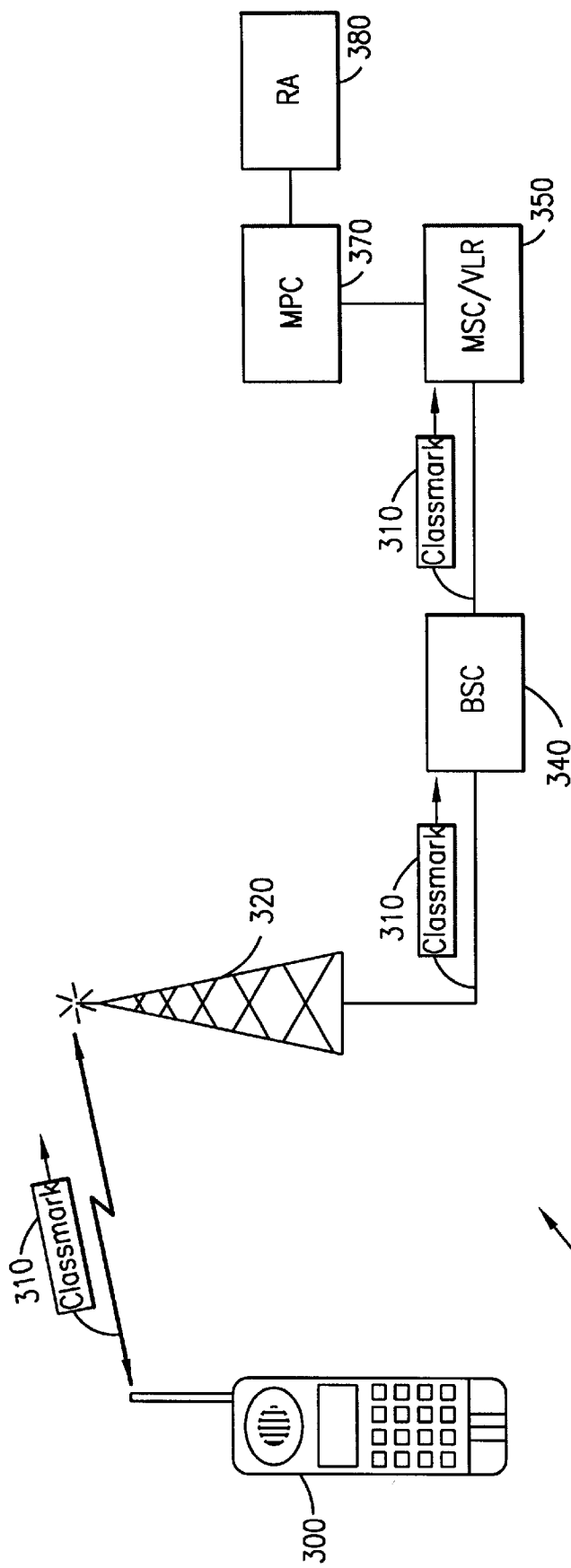
FIG. 3 is a block diagram illustrating the inclusion of terminal-based positioning methods in the CLASSMARK information message sent by a mobile terminal to the network.

With reference now to FIG. 3 of the drawings, when a Requesting Application (RA) 380 sends a positioning request for a particular Mobile Station (MS) 300 to a Mobile Positioning Center (MPC) 370 serving the Location Area (LA) 305 that the MS 300 is currently located in, the RA 380 can also include quality of service information, such as the data rate and/or the reliability of the positioning information returned by the cellular network (MPC 370) performing the positioning. In order to meet these quality of service demands, the MPC 370 must choose the optimum positioning method available. Positioning methods can be network-based, e.g., Timing Advance (TA) method, Time of Arrival (TOA) method, or Angle of Arrival (AOA) method, or terminal-based, e.g., Global Positioning System (GPS) method, Observed Time Difference (OTD) method, or Enhanced OTD method. In order for the MPC 370 to have knowledge of the terminal-based positioning methods, this information must be sent to the MPC 370 prior to receiving a positioning request.

Therefore, the MS 300 positioning capabilities can be sent to a serving Mobile Switching Center/Visitor Location Register (MSC/VLR) 350 when the MS 300 registers with the MSC/VLR 350. For example, in GSM systems, the MS 300 positioning method capabilities can be passed towards the MSC/VLR 350 with the existing GSM message BSSMAP CLASSMARK UPDATE 310, as is understood in the art. Specifically, the "classmark information element 3" 310 can be extended to include MS 300 positioning capabilities. The classmark information message 310 typically describes attributes of the MS 300, such as encryption capabilities, RF power level supported and short message capability. The MS 300 positioning methods can be sent towards the network as part of controlled early classmark sending, during dedicated mode, when the MS 300 wishes to indicate to the MSC/VLR 350 a change of positioning capabilities, after a BSSMAP CLASSMARK REQUEST message from the MSC/VLR 350, in which case the MS 300 can send a classmark information 3 message 310, or during a positioning handover, in which case, either a CLASSMARK UPDATE can be sent to a target Base Station Controller (BSC) (not shown) or a HANDOVER REQUEST including the MS 300 positioning capabilities can be sent to the target BSC.

The new CLASSMARK information shall indicate to the MSC/VLR 350 whether the MS 300 can support terminal-based positioning, the type of terminal-based positioning methods supported, and whether the MS 300 is capable of performing location calculations based upon the positioning measurements that it performed itself. It should be noted that other related information can also be included in the message to the MSC/VLR 350.

Once the MSC/VLR 350 receives the terminal-based positioning methods, this information can be sent to the serving MPC 370 for later use in determining the optimum positioning method. However, it should be understood that the MPC 370 could be co-located with the MSC/VLR 350, and thus the information would not need to be sent to a separate node.

Figure 4:
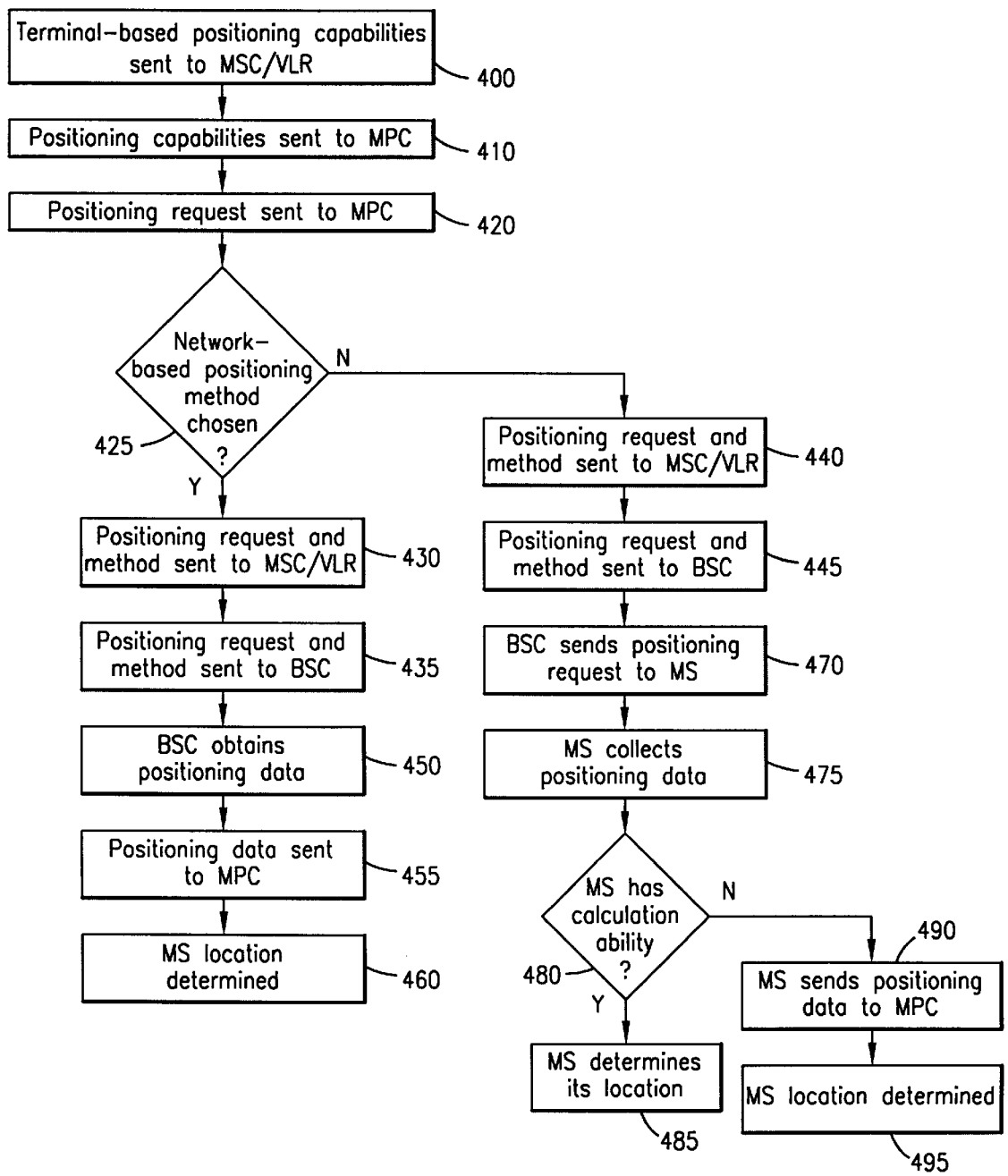
FIG. 4 illustrates steps in a sample determination of an optimum positioning method in accordance with preferred embodiments of the present invention.

With reference now to FIG. 4 of the drawings, after the classmark information 310, including the MS 300 positioning capabilities, has been sent to the MSC/VLR 350 (step 400) and forwarded to the MPC 370 (step 410), when a positioning request comes in to the MPC 370 (step 420), the MPC 370 must then determine the optimum positioning method based upon the available network-based and terminal-based positioning methods and the quality of service requested by the RA 380 (step 425). Once the positioning method has been chosen, e.g., either a network-based or a terminal-based method (step 425), the positioning request, along with the positioning method, is sent to the serving MSC/VLR 350 (steps 430 and 440). The serving MSC/VLR 350 then forwards the positioning request to a serving Base Station Controller (BSC) 340 (steps 435 and 445). If the MS 300 is in idle mode, the serving MSC/VLR 350 must page the MS 300 and setup a call to the MS 300 prior to forwarding the positioning request to the BSC 340 (steps 435 and 445). This call does not activate the ringing tone on the MS 300, and therefore, is not noticed by the MS 300.

If the positioning method is a network-based positioning method (step 425), the BSC 340 then obtains positioning data from at least a serving Base Transceiver Stations (BTS) 320 (step 450) (although typically three BTS's 320 are used), and sends this positioning data to the MPC 370 (step 455) via the MSC/VLR 350 for calculation of the location of the MS 300 (step 460). However, if the positioning method is a terminal-based positioning method (step 425), the BSC 340 sends the positioning request to the MS 300 via the serving BTS 320 (step 470), the MS 300 collects the positioning data (step 475), and if the MS 300 has calculation abilities (step 480), the MS 300 determines it's location (step 485). However, if the MS 300 does not have the ability to calculate it's location based upon the positioning data obtained (step 480), the MS 300 forwards the positioning data to the MPC 370 via the BSC 340 and the MSC/VLR 350 (step 490) for calculation of the MS 300 location (step 495).

Figure 1:
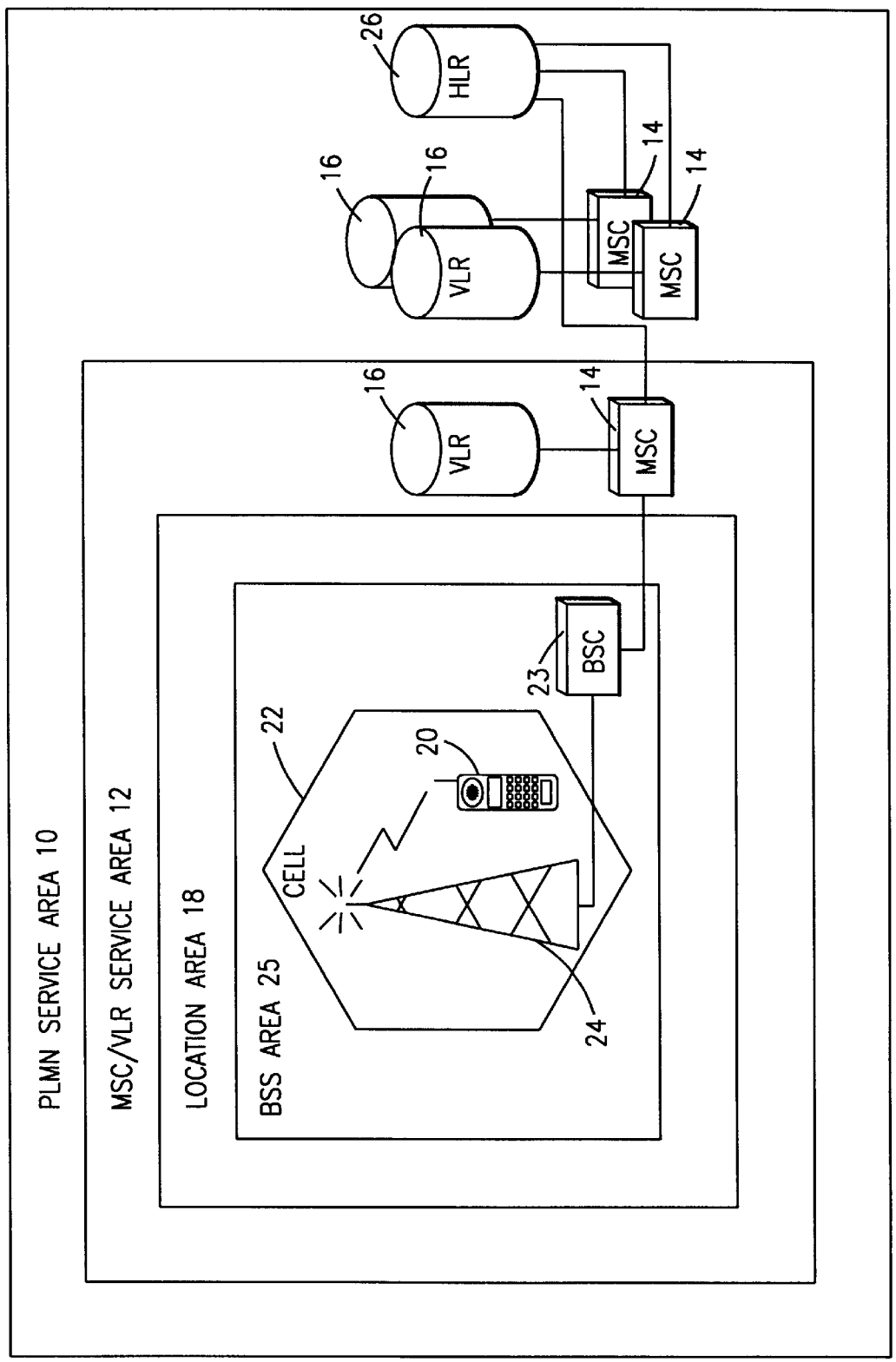
FIG. 1 is a block diagram of a conventional terrestrially-based wireless telecommunications system.
Figure 2:
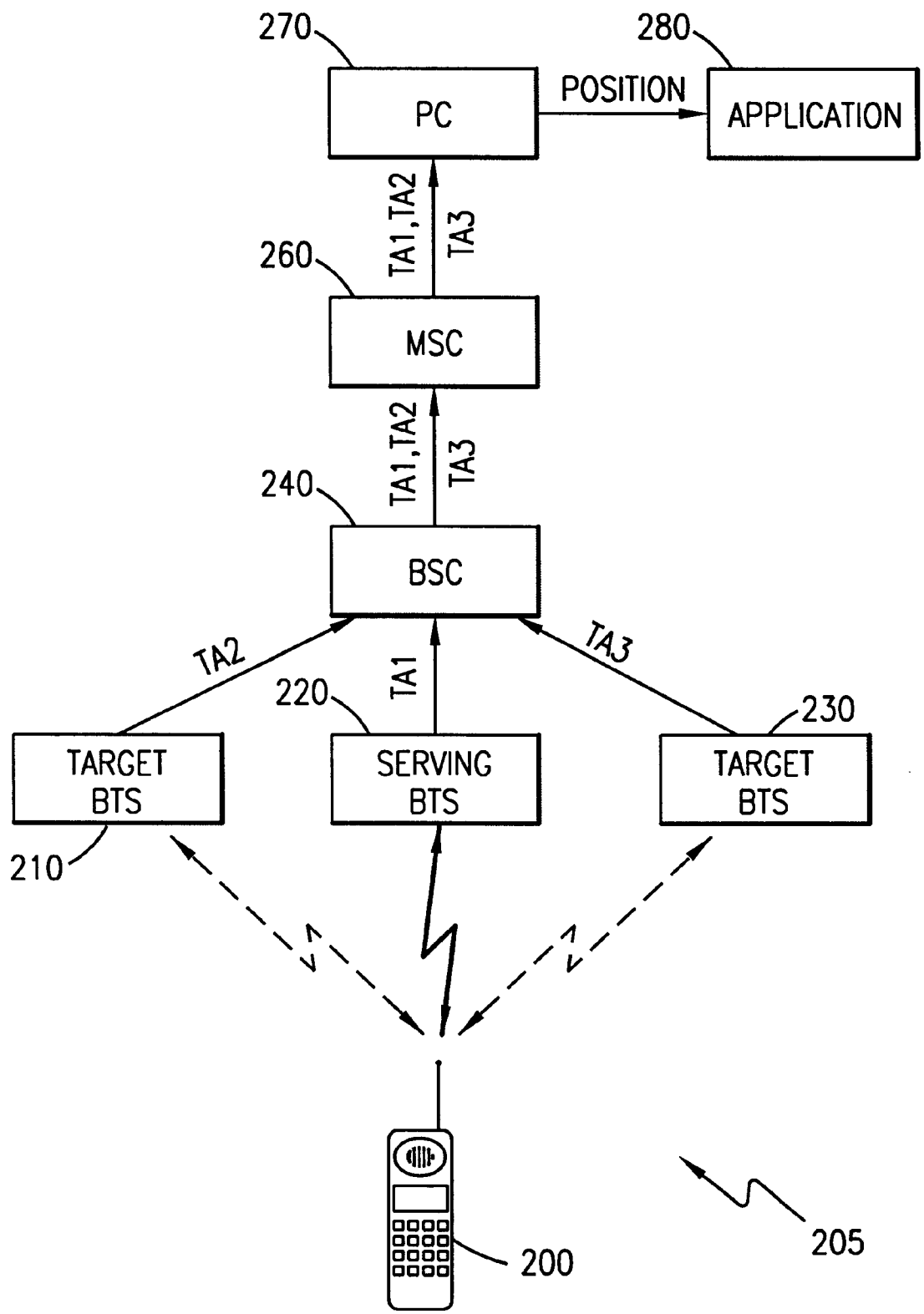
FIG. 2 illustrates a sample positioning handover in which positioning data is acquired by a target base transceiver station and transmitted to a serving base station controller.
Figure 5:
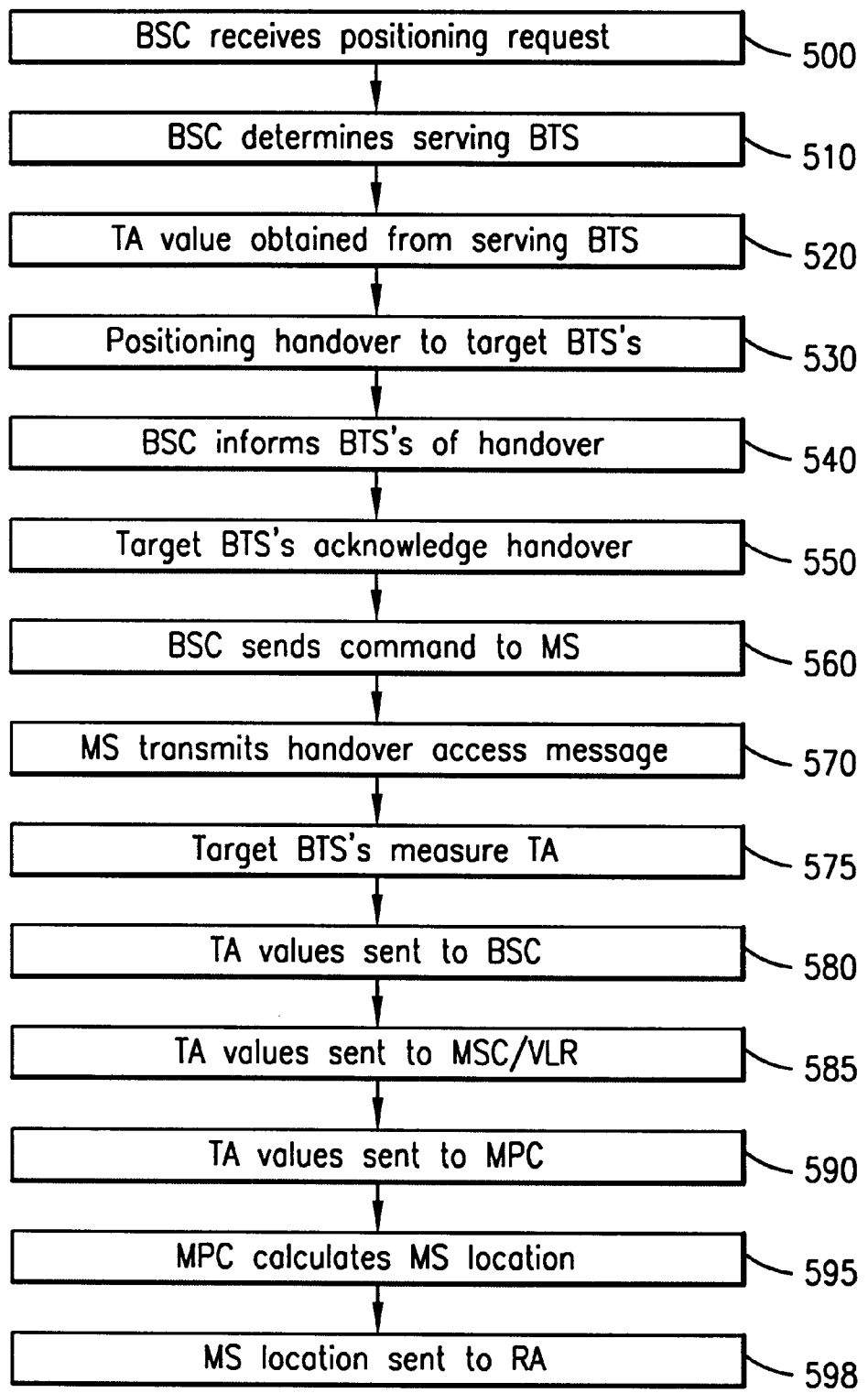
FIG. 5 illustrates steps in a sample Timing Advance positioning method.

With reference now to FIG. 5 of the drawings, which can be described in connection with FIG. 2 of the drawings, if, for example, the Timing Advance (TA) positioning method is chosen by the MPC 270, after the BSC 240 receives the positioning request from the MSC/VLR 260 (step 500), the originating BSC 240 then determines which Base Transceiver Station (BTS) 220 is currently serving the MS 200 (step 510), and obtains a Timing Advance (TA) value (TA1), or other positioning data, from this serving BTS 220 (step 520), if possible. Thereafter, TA values are obtained from two target BTSs (210 and 230) (step 580) by performing a positioning handover (step 530). If the serving BTS 220 does not support positioning, an additional target BTS (not shown) must be selected. It should be noted that other positioning methods based on triangulation can be used instead of obtaining TA values, as discussed herein. In addition, positioning of the MS 200 can be performed using more than three BTSs (210, 220, and 230).

The positioning handover to one of the target BTSs 230 (step 530) is accomplished by the serving BSC 240 sending a new ACTIVATION TYPE in a CHANNEL ACTIVATION message to the target BTS 230, which informs the target BTS 230 that a positioning handover needs to be performed (step 540). The target BTS 230 then acknowledges the CHANNEL ACTIVATION message to the serving BSC 240 (step 550).

Thereafter, the BSC 240 sends a command to the MS 200 via the serving BTS 220 (step 560) to transmit a HANDOVER ACCESS message to the target BTS 230 (step 570). During the time that the MS 200 is waiting for a response from the target BTS 230, e.g., around 320 milliseconds, the target BTS 230 measures the Timing Advance value (access delay) (TA3) (step 575), using access bursts sent by the MS 200, and forwards this positioning data to the serving BSC 240 (step 580). A positioning handover can then be performed to the other target BTS 210 in the same manner as stated hereinbefore. The TA value measured by the target BTS 230 (TA3) is then transmitted by the serving BSC 250 to the MSC/VLR 260, together with TA values (TA1 and TA2) obtained from the serving BTS 220 and other target BTSs 210 (step 585).

Finally, the TA value acquired from the target BTS 230 (TA3), together with other TA values (TA1 and TA2) are forwarded to the serving Mobile Positioning Center (MPC) 270 from the MSC/VLR 260 (step 590), where the location of the MS 200 is determined using the triangulation algorithm (step 595). The MPC 270 then presents the geographical position of the MS 200 to the Requesting Application (node) 280 (step 598).

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the location services can be used by applications located-in or connected-to the subscriber's MS, by network applications or by external applications.

In addition, it should be understood that the positioning systems and methods disclosed herein can be utilized by any cellular network, including, but not limited to, the Global System for Mobile Communications (GSM) network, the Personal Communications System (PCS) network, the AMPS network and the D-AMPS network.

What is claimed is:

1. A telecommunications system for determining an optimum positioning method for locating a given one of a plurality of mobile terminals in within a cellular network, said telecommunications system comprising:
a mobile switching center within said cellular network, said given mobile terminal being in wireless communication with said mobile switching center, said given mobile terminal having terminal-based positioning method information associated therewith, said given mobile terminal sending a message having said terminal-based positioning method information to said mobile switching center; and
a positioning node in communication with said mobile switching center, said positioning node having network-based positioning method information stored therein, said mobile switching center sending said terminal-based positioning method information to said positioning node, said positioning node determining said optimum positioning method based upon said network-based positioning method information and said terminal-based positioning method information, said positioning node using said optimum positioning method to locate said given mobile terminal.

2. The telecommunications system of claim 1, further comprising a requesting node in communication with said positioning node, said requesting node sending a positioning request to said positioning node, said positioning node using said optimum positioning method to determine the location of said given mobile terminal, said positioning node sending the location of said given mobile terminal to said requesting node.

3. The telecommunications system of claim 1, wherein said positioning node is a Mobile Positioning Center.

4. The telecommunications system of claim 1, wherein said positioning node and said mobile switching center are co-located.

5. The telecommunications system of claim 1, wherein said message is a CLASSMARK UPDATE message.

6. The telecommunications system of claim 5, wherein said terminal-based positioning method information is sent in a classmark information element 3 within said CLASSMARK UPDATE message.

7. The telecommunications system of claim 1, wherein said terminal-based positioning method information includes a positioning indicator indicating whether said given mobile terminal can perform positioning, at least one terminal-based positioning method when said positioning indicator is set to yes, and a calculation indicator indicating whether said given mobile terminal can perform positioning calculations when said positioning indicator is set to yes.

8. The telecommunications system of claim 7, wherein said at least one terminal-based positioning method can be selected from the group consisting of: Global Positioning Service receiver, Observed Time Difference, and Enhanced Observed Time Difference.

9. The telecommunications system of claim 1, wherein said network-based positioning methods are selected from the group consisting of: Time of Arrival method, Timing Advance method, and Angle of Arrival method.

10. A method for determining an optimum positioning method for locating a given one of a plurality of mobile terminals in within a cellular network, said method comprising the steps of:
sending, by said given mobile terminal, a message having terminal-based positioning method information therein to a mobile switching center within said cellular network, said mobile switching center being in wireless communication with said given mobile terminal;
storing, within a positioning node in communication with said mobile switching center, network-based positioning method information;
sending, by said mobile switching center, said terminal-based positioning method information to said positioning node;
determining, by said positioning node, said optimum positioning method based upon said network-based positioning method information and said terminal-based positioning method information; and
determining, by said positioning node, the location of said given mobile terminal within said cellular network, using said optimum positioning method.

11. The method of claim 10, further comprising, before said step of determining said optimum positioning method, the step of:
sending, by a requesting node in communication with said positioning node, a positioning request to said positioning node; and after said step of determining the location of said given mobile terminal, the step of:
sending, by said positioning node, the location of said given mobile terminal to said requesting node.

12. The method of claim 10, wherein said positioning node is a Mobile Positioning Center.

13. The method of claim 10, wherein said positioning node and said mobile switching center are co-located.

14. The method of claim 10, wherein said message is a CLASSMARK UPDATE message.

15. The method of claim 14, wherein said terminal-based positioning method information is sent in a classmark information element 3 within said CLASSMARK UPDATE message.

16. The method of claim 10, wherein said terminal-based positioning method information includes a positioning indicator indicating whether said given mobile terminal can perform positioning, at least one terminal-based positioning method when said positioning indicator is set to yes, and a calculation indicator indicating whether said given mobile terminal can perform positioning calculations when said positioning indicator is set to yes.

17. The method of claim 16, wherein said at least one terminal-based positioning method can be selected from the group consisting of: Global Positioning Service receiver, Observed Time Difference, and Enhanced Observed Time Difference.

18. The method of claim 10, wherein said network-based positioning methods are selected from the group consisting of: Time of Arrival method, Timing Advance method, and Angle of Arrival method.

* * * * *